US007183901B2

(12) United States Patent
Legaud

(10) Patent No.: US 7,183,901 B2
(45) Date of Patent: Feb. 27, 2007

(54) LOCAL NETWORK USING AN ELECTRICAL POWER DISTRIBUTION SYSTEM AND ASSOCIATED REFLECTION DEVICE

(75) Inventor: Pierre Legaud, Lannion (FR)

(73) Assignee: France Telecom SA, Paris (FR)

( * ) Notice: Subject to any disclaimer, the term of this patent is extended or adjusted under 35 U.S.C. 154(b) by 95 days.

(21) Appl. No.: 10/819,417

(22) Filed: Apr. 7, 2004

(65) Prior Publication Data

US 2004/0257731 A1 Dec. 23, 2004

(30) Foreign Application Priority Data

Apr. 7, 2003 (FR) .................................. 03 04264

(51) Int. Cl.
*G05B 11/01* (2006.01)
(52) U.S. Cl. ..................... 340/310.13; 307/3; 375/258; 700/286; 702/59
(58) Field of Classification Search ....... 340/310.13 X, 340/310.18; 362/62; 375/258; 702/59; 700/286; 307/3
See application file for complete search history.

(56) References Cited

U.S. PATENT DOCUMENTS

| | | | | |
|---|---|---|---|---|
| 5,589,813 A | * | 12/1996 | Nielsen | 375/257 |
| 5,684,450 A | * | 11/1997 | Brown | 370/493 |
| 5,777,769 A | * | 7/1998 | Coutinho | 398/171 |
| 5,949,236 A | * | 9/1999 | Franchville | 324/533 |
| 6,297,729 B1 | * | 10/2001 | Abali et al. | 340/825.5 |
| 6,417,762 B1 | * | 7/2002 | Comer | 375/260 |
| 6,741,162 B1 | * | 5/2004 | Sacca et al. | 307/3 |
| 6,917,888 B2 | * | 7/2005 | Logvinov et al. | 702/59 |
| 6,952,159 B1 | * | 10/2005 | Muller | 375/257 |
| 2003/0006881 A1 | * | 1/2003 | Reyes | 340/310.01 |
| 2003/0137405 A1 | * | 7/2003 | Kaku et al. | 340/310.01 |

FOREIGN PATENT DOCUMENTS

| WO | WO 00/79697 A1 | 12/2000 |
|---|---|---|
| WO | WO 01/54297 A1 | 7/2001 |

OTHER PUBLICATIONS

C. K. Lim, P. L. So, E. Gunawan, S. Chen, T. T. Lie and Y. L. Guan, "Development of a Test Bed for High-speed Power Line Communications", Fourth International Conference on Power System Technology (PowerCon 2000), Perth, Australia, Dec. 4-7, 2000, pp. 451-456.

* cited by examiner

*Primary Examiner*—Brent A. Swarthout
(74) *Attorney, Agent, or Firm*—Gerald E. Helget; Nelson R. Capes; Briggs and Morgan, P.A.

(57) ABSTRACT

The invention concerns a local network for the transfer of information among several communication devices connected to an alternating current electrical power distribution system with a pre-determined frequency, the information conveyed in the local network being transferred in the form of electrical signals forming waves in the electrical power distribution system in a frequency band higher than the pre-determined frequency, the electrical power distribution system being connected to an electrical power supply system, characterized in that the local network comprises at least one wave reflection device forming reflected waves in the power distribution system and attenuating the waves of the power distribution network in the electrical power supply system. The invention also concerns the reflection device.

15 Claims, 5 Drawing Sheets

LOCAL NETWORK USING AN ELECTRICAL POWER DISTRIBUTION SYSTEM AND ASSOCIATED REFLECTION DEVICE

This invention concerns a local network capable of allowing transfers of information between several devices, particularly communication devices. More specifically, the invention concerns an improvement making it possible to adapt one or more pre-existing cable networks intended for other uses for the constitution of said local network without specific cabling. The invention also targets any pre-equipped cable network for constituting this type of local network.

In the remainder of the description, local network means a set of electrical lines, typically two-wire lines, extending in an area, for example, premises or a group of premises, to interconnect certain computer, office, or conditioned audio-visual apparatus so that they can exchange information with one another. The invention therefore proposes to adapt an electrical power distribution system without modifying its original function to allow it in addition to play the role of local network as defined above.

Local computer networks configured using a pre-existing electrical power distribution system are known. These networks use technologies commonly called PLC or Powerline Communication. PLC technologies offer the possibility of transmitting data via the electrical network.

By using electrical power distribution systems it is thus possible to transfer information received from a computer device connected to an Internet access point to other computer devices without having to install specific cabling for these transfers.

The wavelengths of the signals used to transfer these data over the power distribution system are of the same magnitude as the length of the cables of the power distribution system. Thus we cannot assume that the signals transmitted are equipotential in these cables.

Thus, voltage and current are considered to be a superimposition of at least two waves moving in opposite directions over the power distribution system line: one incident wave and one reversed wave.

Electrical power distribution networks have a frequency response that is not flat. This is due to echos and reflections between transmitter and receiver.

A very high speed requires a large bandwidth, and if this bandwidth comprises frequency hollows (due to interference connected to multiple paths), there is a total loss of the information for the corresponding frequency. The channel is then called frequency "selective."

The modems used to transfer information via a power distribution system ensure the transfer of information up to distance on the order of one hundred meters. These modems use, for example, OFDM (Orthogonal Frequency Division Multiplexing) modulation techniques.

In this modulation technique, we divide a high-speed bit stream into a multitude of streams or channels that are modulated at low speed. Each of these subchannels is modulated by a different frequency; the spacing between each frequency remains constant.

Thus the information is distributed over a large number of carriers, thus creating very narrow subchannels for which the frequency response of the channel can be considered constant.

By using these types of modems in local networks using the power distribution system as transmission medium, the signal produced by a local network modem, due to its range, generates noise on the nearby local networks that also use their electrical power distribution system as transmission medium.

For example, in the same building, if several apartments each have a local network using their electrical power distribution system as transmission medium, the data transmitted in one apartment interfere with the data received in the other apartments. This proximity of the local networks therefore degrades their performance.

Therefore, the aim of the invention is to resolve the aforementioned disadvantages by proposing a local network for the transfer of information between several communication devices connected to an alternating current electrical power distribution system with a pre-determined frequency, the information conveyed in the local network being transferred in the form of electrical signals forming waves over the electrical power distribution system in a frequency band higher than the pre-determined frequency band, the electrical power distribution system being connected to an electrical power supply system, characterized in that the local network comprises at least one wave reflection device forming reflected waves in the power distribution system.

Thus, the local network according to the invention no longer interferes with other local networks connected to the power supply system. The noise generated by the local network according to the invention no longer interferes with the reception of data in the other local networks connected to the power supply system.

More specifically, the power distribution system comprises elements for attenuating the waves of the power distribution system and the reflection device is placed at a pre-determined point of the electrical power distribution system so that the attenuation elements attenuate, among others, the reflected waves in the power distribution system.

Thus, the transfer of information between several communication devices of the local network is not perturbed, and the waves reflected by the reflection device according to the invention are attenuated by the attenuation elements of the power distribution system. Simply put, with a reflection device and judicious use of the attenuation elements of the power distribution system, the invention prevents interference with the transfer of information between the communication devices of the local network.

More specifically, the attenuation elements consist of at least one means of protection of an electrical power distribution line of the electrical power distribution network.

Thus, by using the attenuations inherent in the protection devices, the transfer of information between the communication devices of the local network is not degraded.

More specifically, the electrical power distribution network comprises several electrical power distribution lines, an electrical panel distributing the electrical power to each electrical power distribution line, and the electrical panel is an attenuation element.

Thus, by using the coupling effect of the electrical panel, the reflected wave is attenuated.

More specifically, the reflection device is placed in the electrical panel.

Thus, the waves present in one of the electrical power distribution lines of the electrical power distribution system are transmitted to the other electrical power distribution lines of the electrical power distribution system. Two communication devices can thus reciprocally transfer information while being connected to different electrical power distribution lines. As the reflection device is separated from the communication devices by a large number of attenuation elements, the quality of the transfer of information between the communication devices is maintained.

More specifically, the reflection device is placed in a male electrical plug inserted into a female electrical outlet of the electrical power distribution system.

Thus, it is very easy for an unskilled user to place the reflection device in the local network using the electrical power distribution system as transmission medium.

Preferentially, the electrical female outlet is on the electrical power distribution line to which the communication devices are connected and is placed between the communication devices and the electrical power supply system.

Thus, the transfer of information between the communication devices is guaranteed.

Correlatively, the invention proposes a device for the transfer of information between several communication devices in a local network, the devices being connected to an alternating current electrical power distribution system with a pre-determined frequency, the information conveyed in the local network being transferred in the form of electrical signals forming waves over the electrical power distribution signal in a frequency band higher than the pre-determined frequency, the electrical power distribution system being connected to an electrical power supply system characterized in that the device comprises means for reflecting waves forming reflected waves in the power distribution system.

Preferentially, the means for reflection and attenuation consist of at least one condenser.

Thus, reflection and attenuation are accomplished simply and economically.

More specifically, the device is integrated into a male electrical plug.

Thus, this plug is easy to use for a person who is not specialized in producing local networks using a power distribution system as medium of the local network.

Advantageously, the device is integrated into an electrical panel.

Thus, the reflected waves are attenuated by a large number of attenuation elements of the electrical power distribution system. It is also easy to add the device according to the invention in an existing electrical power distribution system.

Preferentially, the device is placed between the phase and the neutral of the electrical power distribution system.

Thus, by placing the device parallel between the phase and the neutral, it is not necessary to consider the total power absorbed by the apparatus connected to the power distribution system to determine the characteristics of the elements making up the reflection device.

The features of the invention mentioned above as well as others will become clearer upon reading the following description of an embodiment, said description being given in relation to the appended drawings in which.

The electrical power distribution system 29 is situated in premises such as an apartment, a house or an office, for example.

This system is, for example, a single-phase electrical power distribution system with alternating current voltage of 240 Volts whose frequency is on the order of 50 Hz.

Of course, this electrical power distribution system can be a three-phase system or a single-phase system supplying alternating current voltage on the order of one hundred Volts and at a frequency of 50 or 60 Hz.

Figure 1:
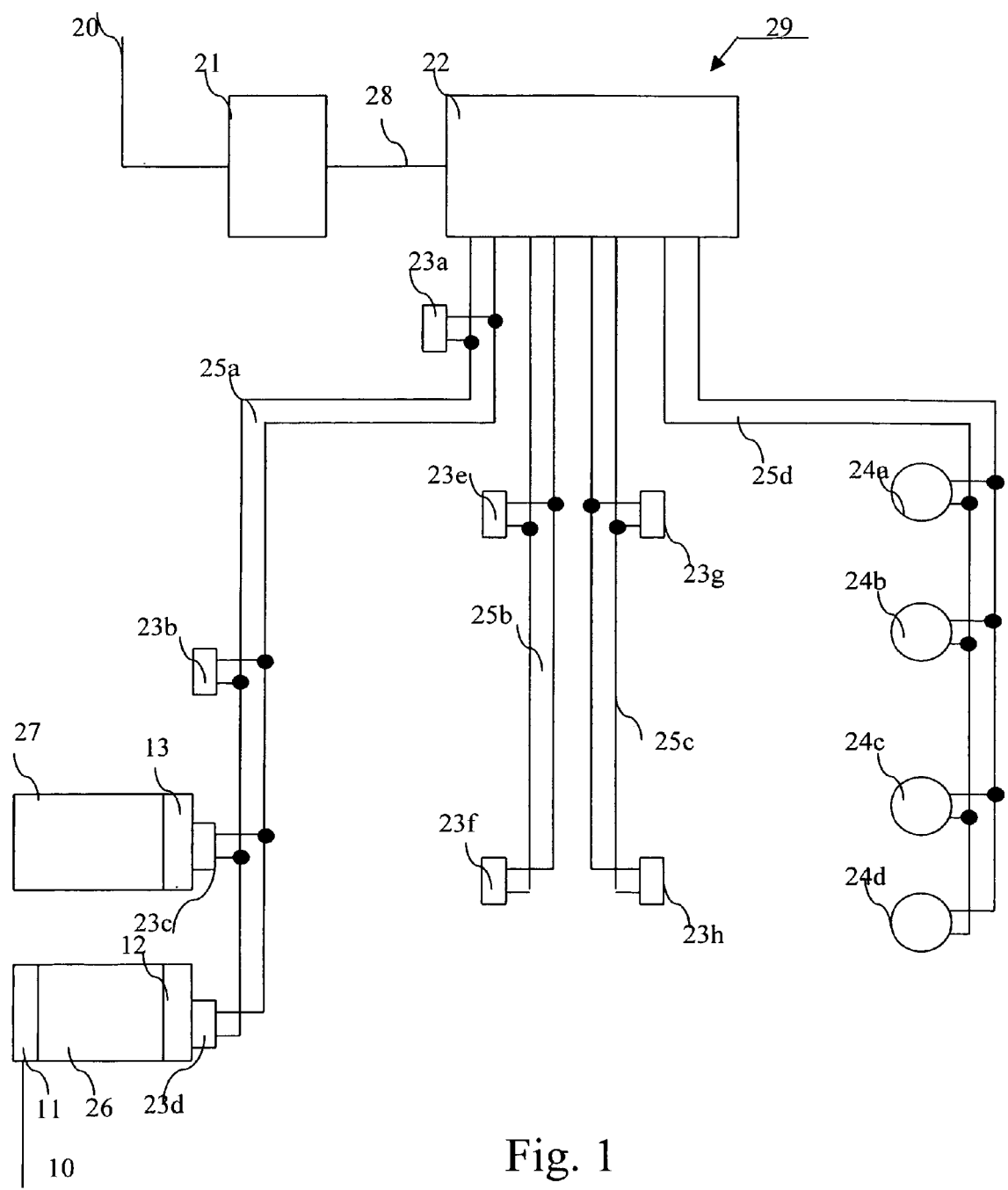
FIG. 1 represents a local computer network using a pre-existing electrical power distribution system as transmission medium.

The power distribution system 29 is connected to a power supply system 20 that supplies all the power distribution devices of other premises not shown in FIG. 1.

At the entry of the electrical power distribution system 29 a meter 21 is connected that is capable of determining the electrical power consumed by the equipment 26, 27 and 24 connected to the power distribution system 29. This equipment 26, 27 and 24 will be described later in reference to this FIG. 1.

This meter 21 is connected via a cable 28 to an electrical panel 22. The electrical panel 22 will be described in more detail in reference to FIG. 3.

The electrical panel 22 distributes the electrical power to a multiplicity of lines 25a, 25b, 25c and 25d that handle the distribution of power to the different equipment of the premises comprising the power distribution system 29.

To the power distribution line 25a are connected female electrical outlets 23a, 23b, 23c and 23d allowing the connection of devices such as computers 26 and 27.

The computer 26 is equipped with a communication modem 11 that communicates with a communication network 10. The communication network 10 is, for example, an Internet network; it may also be a cabled network for the supply of audio video or other data.

The computer 26 is equipped with a modem 12 allowing it to communicate with a second computer 27, which is itself equipped with a modem 13.

The modems 12 and 13 are, for example, modems sold by ELCON under the reference EPLC 10 Mi. These modems 12 and 13 preferentially use the OFDM modulation techniques mentioned previously.

These modems 12 and 13 transfer information concerning the carriers in a frequency spectrum between 4 MHz and 20 Mhz.

Thus, the modems 12 and 13, the female electrical outlets 23c and 23d, the part of the power distribution line 25a between the female electrical outlets 23c and 23d make up a local network using a pre-existing cable network (female electrical outlets 23c and 23d, power distribution line 25a).

The power distribution line 25a has female electrical outlets 23a and 23b not used in our example.

To the power distribution lines 25b and 25c are connected female electrical outlets 23e, 23f and 23g and 23h allowing, for example, the connection to the electrical power distribution system 29 of household appliances (not shown), audio-video equipment (not shown) or other equipment.

The power distribution system 29 also comprises a power distribution line 25d allowing the distribution of electrical power to lighting apparatus marked 24a to 24d.

Figure 2:
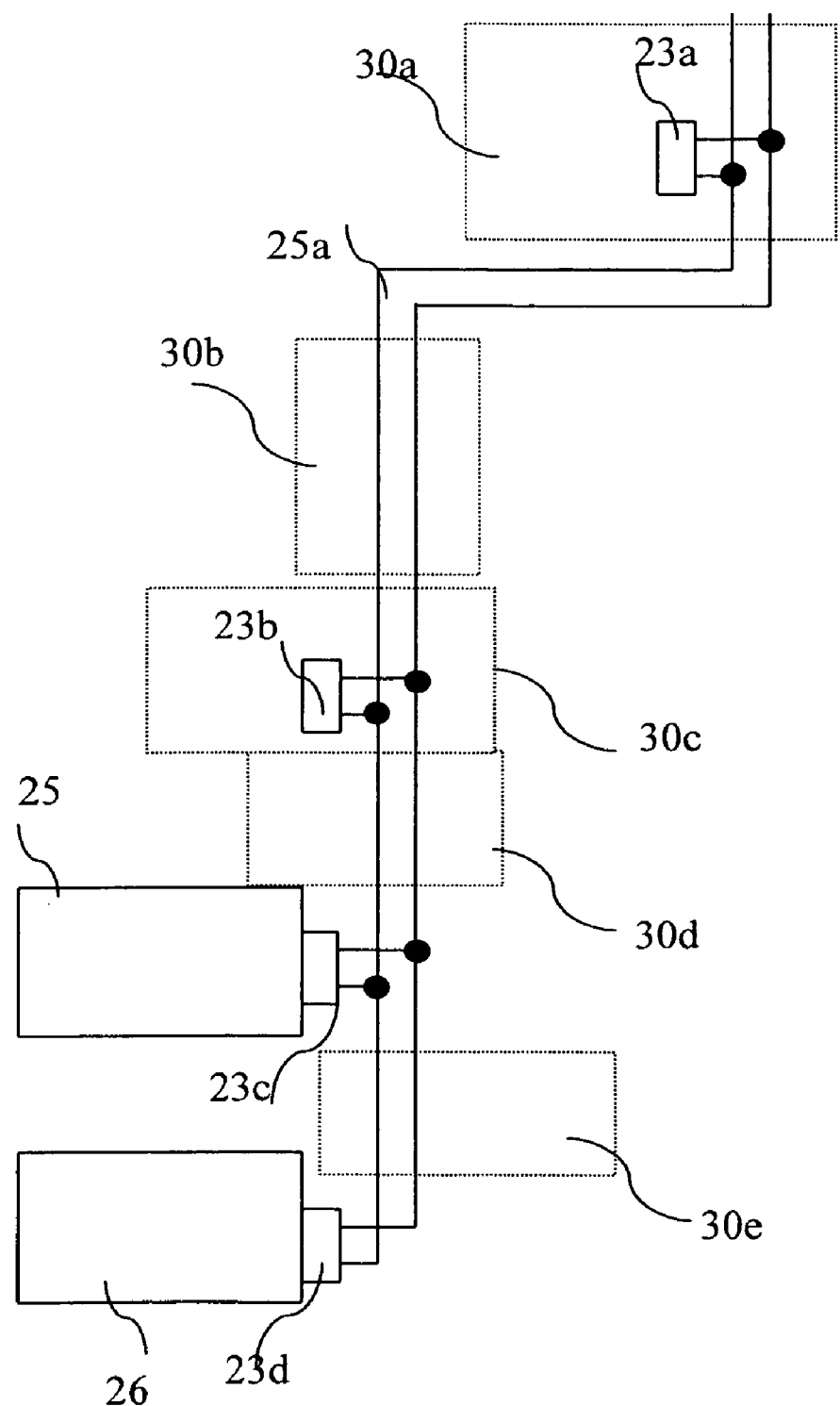
FIG. 2 represents a power distribution line used as medium of the local network according to the invention.

FIG. 2 represents a power distribution line 25a used as medium of a local network according to the invention.

The power distribution line 25a is broken down into different elements referenced as 30a, 30b, 30c, 30d and 30e.

The electrical waves generated by the modems 12 and 13 have a non-negligible wavelength compared to the length of the power distribution line 25a.

These modems 12 and 13 transfer data in a frequency spectrum ranging up to frequencies on the order of 20 MHz. The wavelength in the air of a wave at a frequency f of 20 MHz is given by the formula $\lambda=c/f$ where c is the celerity of the light. Of course, when the wave travels in a cable, the celerity c must be replaced by the celerity c' of the electromagnetic field in the cable. Thus, the wavelength at the frequency 20 MHz is considered here on the order of 15 meters.

This wavelength is thus of the same order of magnitude as the length of a traditional power distribution line 25 in an apartment or a house. It is often exceeds a length of some ten meters.

The elements 30 constitute attenuation elements for the waves formed by the electrical signals of the modems 12 and 13.

The elements 30a comprises the female electrical outlet 23a. The female electrical outlet 30a constitutes an open branch of the electrical power distribution system 25a. The element 30a therefore creates reflections attenuating the waves formed by the electrical signals of the modems 12 and 13.

The same is true for the element 30c.

The cabling of an electrical power distribution system 29 in premises is often produced using semi-rigid conductor wires housed in a jacket. The distance between the conductor wires is not constant along the length of the electrical power distribution line and varies according to the installation contingencies of these conductor wires. In general, we assume that an electrical power distribution system presents an average impedance surge on the order of 120 Ohms.

The impedance surge of a transmission line depends on the linear resistance of the conductors, their linear inductance, their linear capacity as well as their linear conductance. This linear capacity is determined based on the distance separating the conductors, the conductor surfaces opposite one another and the permittivity of the material placed between the two conductors. This linear capacity is particularly unstable for electrical power distribution systems. Indeed, the distance separating the conductors is not controlled. This thus makes the impedance surge of a power distribution line 25 non-uniform.

This impedance surge is highly variable, and any variation of this impedance surge, represented by elements 30b, 30d and 30e creates attenuation, and even reflections attenuating the waves formed by the electrical signals of the modems 12 and 13.

Thus, the line electrical power distribution line 25a comprises attenuation elements (referenced as 30) for the waves formed by the electrical signals of the modems 12 and 13 in the power distribution system 29.

Figure 3:
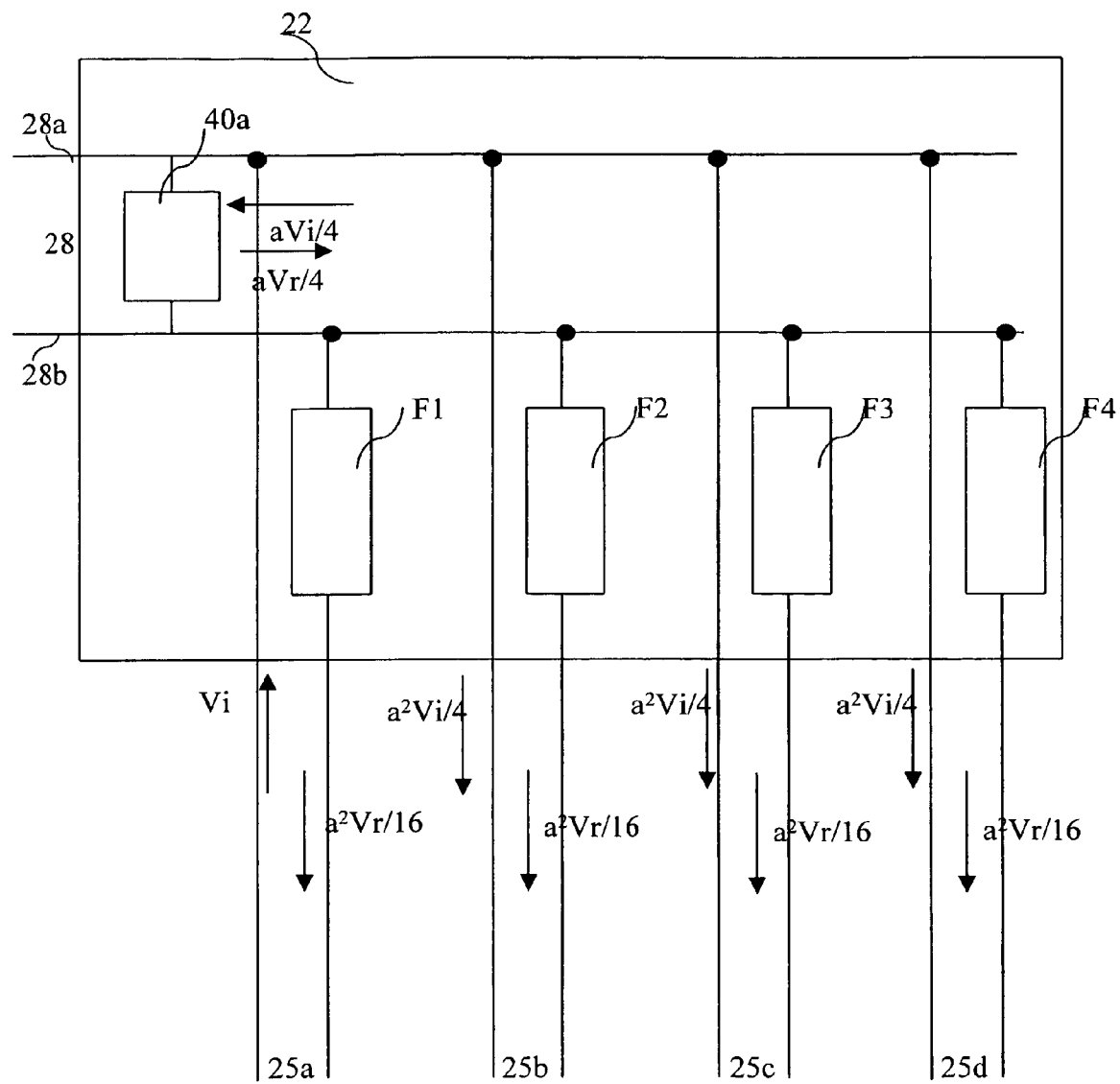
FIG. 3 represents an electrical panel of a power distribution system comprising the reflection device according to the invention.

FIG. 3 represents and electrical panel 22 of a power distribution system 29 comprising the reflection device according to the invention.

The electrical panel 22 is connected to the power supply system 20 supplying a set of premises not show through conductors 28.

In a concern for clarity, the conductors connecting the electrical system to the ground are not shown, only the conductors commonly called phase (marked 28b) and neutral (marked 28a) are represented here.

It is clearly understood that the invention as described here functions for signals transmitted by the modems 12 and 13 between the phase and the neutral and for signals transmitted by the modems 12 and 13 between the phase and the ground or the neutral and the ground. The reflection device for incident electrical waves, forming electrical waves reflected in the local network must then, in this case, be placed respectively between the phase and the ground or between the neutral and the ground.

The electrical panel 22 comprises, by way of example, four line protection circuits 25 identified as F1, F2, F3 and F4.

These protection circuits F1 to F4 for lines 25 are, for example, circuit breakers or fuses.

These protection circuits F1 to F4 attenuate the waves passing through them by a few decibels; these protection circuits therefore constitute attenuation elements for the waves in the system 29.

The protection circuit F1 protects the power distribution line 25a from possible short-circuits or overloads on it.

The protection circuit F2 protects the power distribution line 25b from possible short-circuits or overloads on it.

The protection circuit F3 protects the power distribution line 25c from possible short-circuits or overloads on it.

The protection circuit F4 protects the power distribution line 25d from possible short-circuits or overloads on it.

The electrical panel 22 also comprises a device marked 40a for reflection of waves formed by the electrical signals generated by the modems 12 or 13 of FIG. 1.

This reflection device 40a, placed between the phase and the neutral of the electrical power distribution system 28, reflects the waves traveling in the power distribution system 29 and thus blocks all propagation of them outside the electrical power distribution system 29.

Thus, the waves traveling in the power distribution system 29 are not propagated or at least are greatly attenuated in the power supply system 20 supplying all the power distribution systems used as local networks (not represented).

Thus, the waves traveling in the power distribution system 29 do not perturb the nearby local networks.

By way of example, an incident wave Vi is represented on the power distribution line 25a. This incident wave is, for example, formed by the electrical signals generated by the modem 12 in the local network made up by the power distribution line 25a.

The wave Vi is in reality made up of a combination of a multiplicity of waves, an incident wave as well as reflected waves generated by the attenuation elements marked 30 of the power distribution line 25a. Nevertheless, in a concern for simplification and clarity, the wave Vi will be called the incident wave in the remainder of this description.

The wave Vi is attenuated by the protection circuit F1 and thus forms an incident wave attenuated by an attenuation factor identified as a.

The electrical panel 22 in our example has three other power distribution lines identifies as 25b, 25c and 25d protected respectively by protection circuits F2, F3 and F4 and is connected to the power supply system 20 supplying a set of premises not represented through conductors 28a and 28b to which the reflection device 40a is connected.

The electrical panel 22 is thus assimilable to a coupler in the frequency spectrum in which the data in the local system are transferred.

Thus, the incident wave Vi is broken down into four incident waves whose amplitudes are similar and on the order of aVi/4.

One wave aVi/4 travels through the protection circuit F2 and forms a signal $a^2$Vi/4 in the power distribution line 25b.

One wave aVi/4 travels through the protection circuit F3 and forms a signal $a^2Vi/4$ in the power distribution line 25c.

One wave aVi/4 travels through the protection circuit F4 and forms a signal $a^2Vi/4$ in the power distribution line 25d.

One wave aVi/4 travels toward the conductors 28a and 28b to which the reflection device 40a is connected.

The reflection device 40a then reflects this wave aVi/4 and thus forms a reflected wave called aVr/4.

In the same way, the electrical panel 22 is assimilable to a coupler for the reflected wave in the frequency spectrum in which the data in the local network are transferred.

Thus, the reflected wave aVr/4 breaks down into four reflected waves whose amplitudes are similar and on the order of aVr/16.

One wave aVr/16 travels through the protection circuit F1 and forms a signal $a^2Vr/16$ in the power distribution line 25a.

One wave aVr/16 travels through the protection circuit F2 and forms a signal $a^2Vr/16$ in the power distribution line 25b.

One wave aVr/16 travels through the protection circuit F3 and forms a signal $a^2Vr/16$ in the power distribution line 25c.

One wave aVr/16 travels through the protection circuit F4 and forms a signal $a^2Vr/16$ in the power distribution line 25d.

The reflection device 40a thus placed at a pre-determined point of the electrical power distribution system prevents the propagation, in the power supply system 20 supplying a set of premises, of wave traveling in the power distribution system 29.

Thus, the waves traveling in the power distribution system do not perturb the local networks nearby.

Furthermore, the pre-determined position of the reflection device 40a in the power distribution system 29 greatly limits the influence of the reflected wave on the quality of the transmission in the local network.

Indeed, even if the reflected wave is in a 180 degree phase shift with the incident wave, the amplitudes of the incident and reflected waves on each of the lines 25a, 25b, 25c and 25d are different and therefore the incident and reflected waves do not cancel each other out in the power distribution system.

Figure 4:
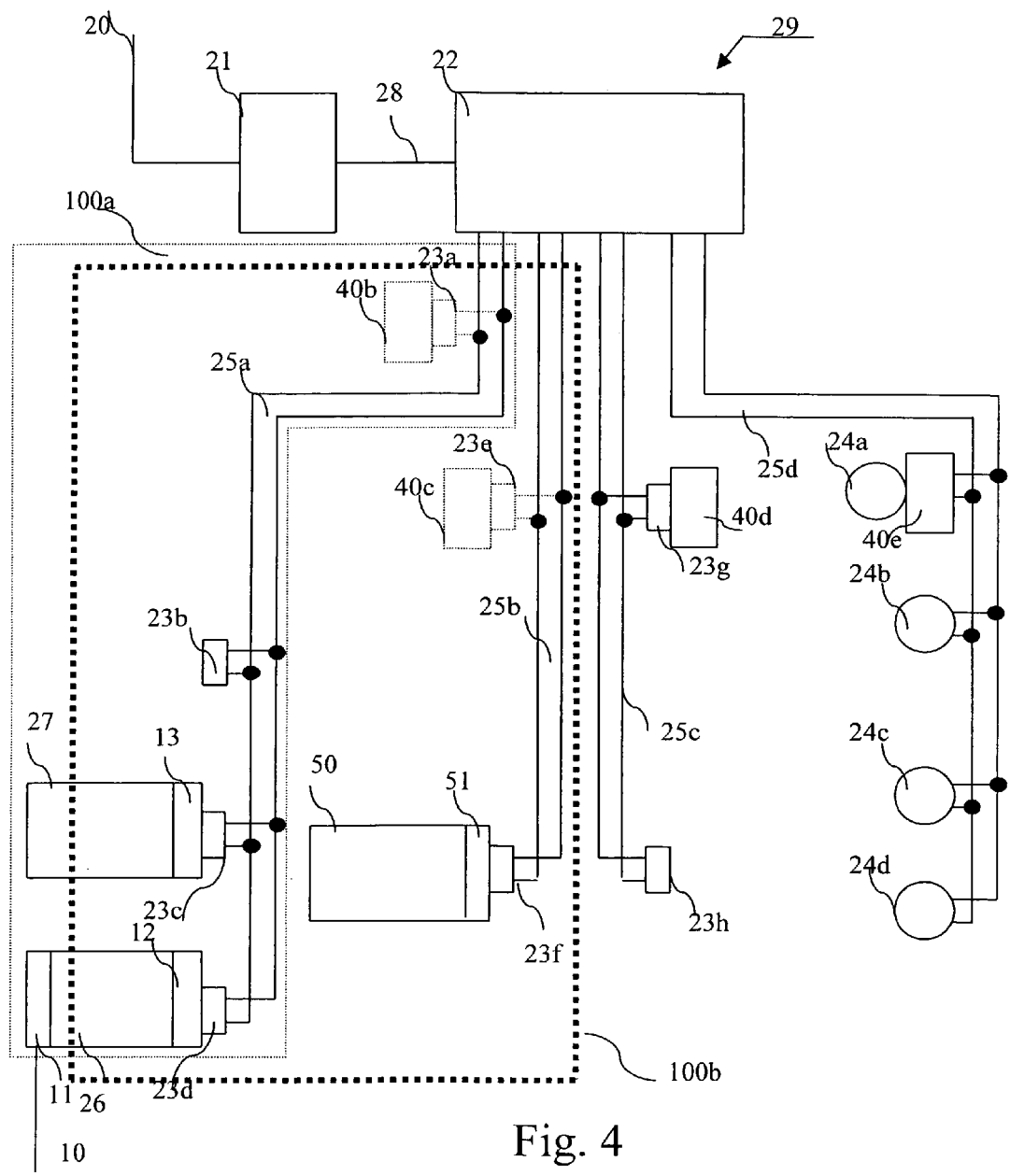
FIG. 4 represents the local computer network using an electrical power distribution system as transmission medium in which the reflection device is placed at different pre-determined points of the electrical power distribution system.

FIG. 4 represents the local computer network using a power distribution system as transmission medium in which the reflection device is placed at different pre-determined points of the electrical power distribution system.

The power supply system 20 and the power distribution system 29 are identical to the supply 20 and power distribution 29 systems of FIG. 1; they will not be described in detail.

According to a first embodiment of the invention, a local network 100a (delimited by dotted lines) is produced with the power distribution line 25a.

According to a first variant of embodiment of the local network 100a, a reflection device 40b is placed on the female electrical outlet 23a.

The power distribution line 25a, in accordance with FIG. 2, comprises attenuation elements 30a, 30b, 30c, 30d and 30e creating attenuations and even reflections attenuating the waves formed by the electrical signals of the modems 12 and 13.

The reflection device 40b is placed in the power distribution system 29 so that the wave reflected by it is attenuated by the attenuation elements 30a, 30b, 30c and 30d.

Thus, the pre-determined position of the reflection device 40b in the power distribution line 25a greatly limits the influence of the reflected wave on the quality of the transmission between the modems 12 and 13 of the devices 26 and 27 and therefore guarantees the proper operation of the local network 100 while preventing the propagation, in the power distribution system 29, of waves traveling in the power distribution line 25a.

As the waves do not travel in the power distribution system 29, they no longer travel in the power supply system 20 either.

The reflection device 40b is, for example, integrated in the male electrical plug plugged into a female electrical outlet 23. With this type of configuration, it is very easy for a user of a local network 100 to place the reflection device 40b in the local network 100a.

It should also be noted that in this variant, thanks to the reflection device 40b, the local network 100a is isolated from the rest of the electrical power distribution system 29.

Indeed, the frequency spectrum of the signals generated by the modems 12 and 13 is such that the signals are transmitted both via conduction and electromagnetic radiation. By placing the reflection device on the outlet 23a, only the electrical power generation line 25a is likely to create electromagnetic radiation.

According to a second embodiment variant of the local network 100a, the local network 100a comprises a reflection device placed in the same manner as described previously in reference to FIG. 3.

This reflection device 40a (not represented), placed between the phase and the neutral of the cable 28 in the electrical panel 22, reflects the waves traveling in the power distribution system 29 and thus blocks any propagation of these waves outside the electrical power distribution system 29.

The power distribution line 25a, in accordance with FIG. 2, comprises attenuation elements 30a, 30b, 30c, 30d and 30e creating attenuations, and even reflections, attenuating the waves formed by the electrical signals of the modems 12 and 13.

The electrical panel 22 comprises attenuation elements consisting of the protection circuit F1 and power distribution lines 25b, 25c and 25d forming a coupler.

The reflection device 40a is placed in the power distribution system 29 so that the wave reflected by it is attenuated by the attenuation elements F1, 25b, 25c, 25d, 30a, 30b, 30c and 30d.

Thus, the pre-determined position of the reflection device 40a in the power distribution system 29 limits even more than in the variant previously described the influence of the reflected wave on the quality of the transmission between the modems 12 and 13 of the devices 26 and 27 and therefore guarantees the proper functioning of the local network 100a while preventing the propagation in the power supply system 20 of waves traveling in the power distribution system 29.

The user of the local network 100a can also combine the use of a reflection device 40a placed in the electrical panel 22 with a reflection device 40 placed in a male electrical plug inserted in a female electrical outlet 23.

By way of example, the reflection devices 40c, 40d, and 40e are placed respectively in the power distribution lines 25b, 25c and 25d.

It should also be noted that in this variant, thanks to the reflection devices 40c, 40d and 40e, the local network 100a is isolated from the rest of the electrical power distribution system 29.

By placing the reflection devices 40c, 40d and 40e on the respective female electrical outlets 23e, 23g and on the socket tube of the lighting devices 24, only the electrical power distribution system 25a is capable of creating electromagnetic radiation.

It must be noted that the reflection devices 40c, 40d and 40e are placed as close as possible to the electrical panel 22.

According to a second embodiment of the invention, a local network 100b (delimited by thick dotted lines) is produced with the power distribution line 25a and the power distribution line 25b.

A device 50 is connected to the female electrical outlet 23f. This device 50 is, for example, a device such as a computer or a television set capable of receiving and/or transmitting information with the computers 26 and 27.

The device 50 is equipped with a modem 51 similar to the modems 12 and 13 of the computers 26 and 27.

Thus, the local network 100b allows the exchange of information between devices 26, 27 and 50 placed on different electrical power distribution lines (25a and 25b).

In this second embodiment, a reflection device 40a is placed in the local network 100b in the same way as described previously in reference to FIG. 3.

The reflection device 40a placed between the phase and the neutral of the cable 28, reflects the waves traveling in the power distribution system 29 and thus blocks any propagation of these waves outside the electrical power distribution system 29.

The electrical panel 22 comprises attenuation elements consisting of protection circuits F1 and F2 and power distribution lines 25b, 25c and 25d forming a coupler As previously described in reference to FIG. 3, a part $a^2Vi/4$ of the incident wave Vi, thanks to the coupling effect of the electrical panel, is retransmitted on the electrical power distribution line 25b. Thus, as we described previously in reference to FIG. 3, a wave aVr/16 travels through the protection circuit F2 and forms a signal $a^2Vr/16$ on the power distribution line 25b.

Thus, even if the reflected wave $a^2Vr/16$ is in 180 degree phase shift with the incident wave $a^2Vr/4$, the amplitudes of the incident wave $a^2Vr/4$ and of the reflected wave $a^2Vr/16$ on the line 25b are different, and therefore the incident and reflected waves do not cancel each other out in the power distribution line 25b.

The power distribution line 25a, in accordance with FIG. 2, comprises attenuation elements 30a, 30b, 30c, 30d and 30e creating attenuations, and even reflections, attenuating the waves formed by the electrical signals of the modems 12 and 13.

The power distribution line 25b also comprises attenuation elements not shown similar to the attenuation elements of the power distribution line 25a.

The reflection device 40a is placed in the power distribution system 29 so that the wave reflected by it is attenuated by the attenuation elements F1, F2, 25b, 25c, 25d, 30a, 30b, 30c, 30d and the attenuation elements not represented of the power distribution line 25b.

Thus, the pre-determined position of the reflection device 40a in the electrical panel 22 greatly limits the influence of the reflected wave on the quality of the transmission between the modems 12, 13 and 51 of the devices 26, 27 and 50. The reflection device 40a thus guarantees the proper functioning of the local network 100b while preventing the propagation in the power supply system 20 of waves traveling in the local network 10b.

It should be noted that the reflection devices 40d and 40e can be placed in the same way as those described in the second variant of the first embodiment of the local network 100a described previously.

Figure 5:
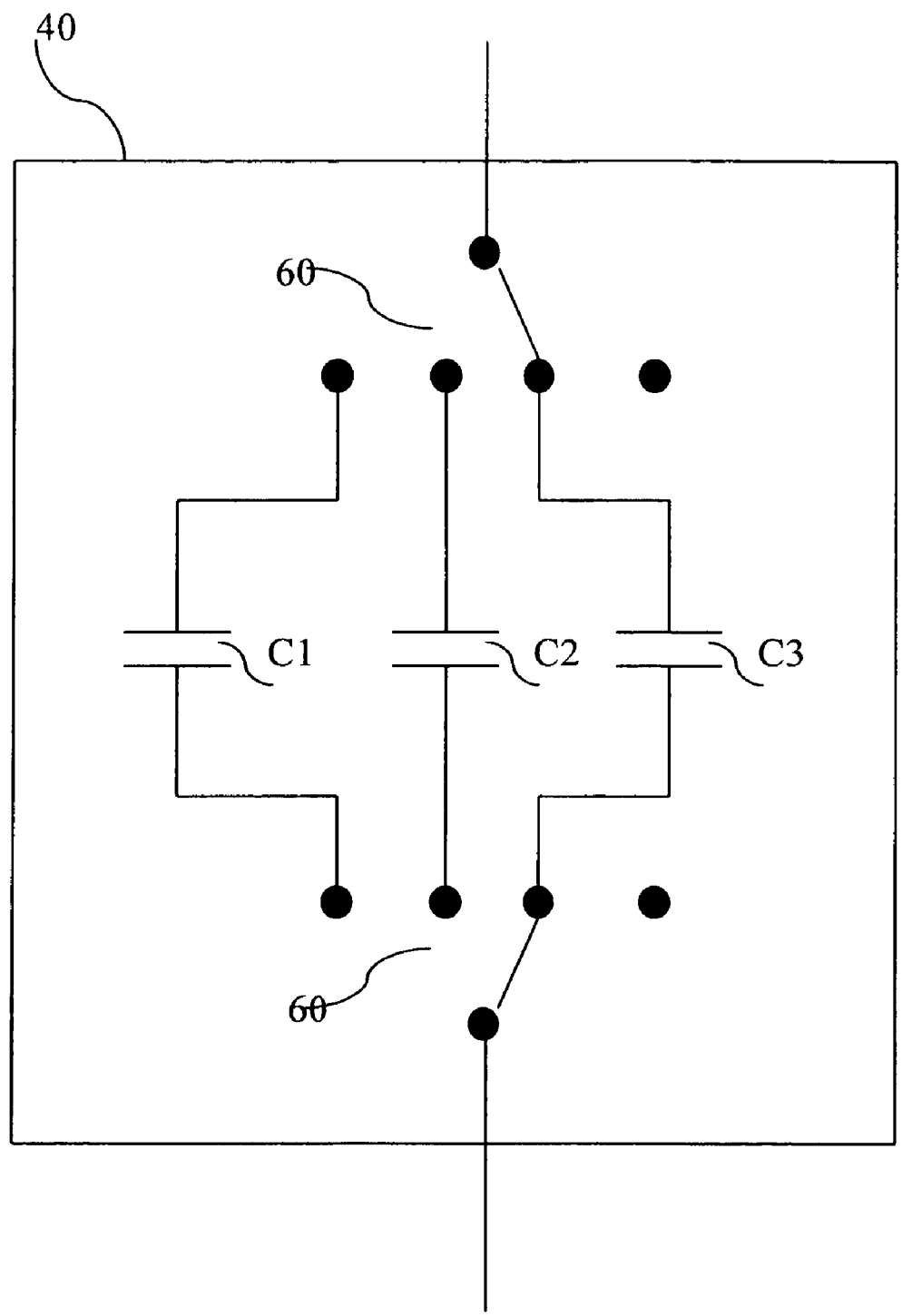
FIG. 5 represents an example of embodiment of a reflection device according to the invention.

FIG. 5 represents an example of embodiment of a reflection device 40 that conforms to the invention.

The reflection device 40 is integrated, for example, in a male electrical plug capable of being plugged into a female electrical outlet 23, or in a socket tube of a lighting device or preferentially in a housing (similar to those used for differential circuit breakers) capable of being placed in an electrical panel 22.

The reflection device 40 comprises at least one condenser C1 with infinite impedance for frequencies on the order of 50 Hz and very low impedance for frequencies between 4 and 20 MHz.

The value of the condenser is determined based on the frequency spectrum used by the modems 12, 13 and 14.

Indeed, in the transmission lines, zero impedance at the end of a transmission line produces a reflection of the incident wave thus forming a reflected wave. In our case, the zero impedance is produced by the condenser.

The reflection device 40 represented in FIG. 5 consists of a switch 60 allowing the user, during installation of the reflection device, to select one of the condensers C1, C2 or C3 of the reflection device 40.

The condensers C1, C2 and C3 are preferentially class X1 metal-coated paper condensers that tolerate the voltage delivered by the electrical power distribution system 29. The condenser C1 has a value of 10 nano Farad, the condenser C2 has a value of 22 nano Farad, while the condenser C3 has a value of 47 nano Farad.

These different values make it possible to adapt the reflection device 40 to the local network using the electrical power distribution system 29 as transmission medium.

The switch 60 of the reflection device 40 also comprises a fourth position that has no short-circuit at the operating frequencies of the modems 12, 13 and 51. This position allows the user to deactivate the reflection device 41 without having to remove it. This is particularly interesting when the user wants to communicate with a local network similar to his through the power supply system 20.

In a particularly simple configuration, the reflection device 40 consists of a single condenser C2 integrated in a housing similar to those used for the differential circuit breakers and is adapted to be placed in an electrical panel.

Of course, reflection devices 40 produced with inductances associated with capacitive elements are easily producible by the person skilled in the art using the teachings of this invention.

Of course, this invention is in no way limited to the modes of embodiment described here, but, quite to the contrary, encompasses all variants within the reach of the person skilled in the art.

The invention claimed is:

1. Local network for the transfer of information between several communication devices connected to an alternating current electrical power distribution system with a pre-determined frequency, the information conveyed in the local network being transferred in the form of electrical signals forming waves in the electrical power distribution system in a frequency band greater than the pre-determined frequency, the electrical power distribution system being connected to an electrical power supply system, wherein the local network comprises at least one device for reflecting waves forming reflected waves in the power distribution system, the device for reflecting waves comprising at least one condenser.

2. Local network as claimed in claim 1, wherein the power distribution system comprises elements for attenuating the waves of the power distribution system and wherein the reflection device is placed at a pre-determined point of the electrical power distribution system so that the attenuation elements attenuate, among other things, the waves reflected in the power distribution system.

3. Local network as claimed in claim 2, wherein the attenuation elements consist of at least one means of protection for an electrical power distribution line of the electrical power distribution system.

4. Local network as claimed in claim 2 or 3, wherein the electrical power distribution system comprises several electrical power distribution lines and an electrical panel distributing the electrical power to each electrical power distribution line and wherein the electrical panel is an attenuation element.

5. Local network as claimed in claim 4, wherein the reflection device is placed in the electrical panel.

6. Local network as claimed in claim 2, wherein the reflection device is placed in a male electrical plug inserted into a female electrical outlet of the electrical power distribution system.

7. Local network as claimed in claim 6, wherein the female electrical outlet is on the electrical power distribution line to which the communication devices are connected and is placed between the communication devices and the electrical power supply system.

8. Device for the transfer of information among several communication devices in a local network, the devices being connected to an alternating current electrical power distribution system with a pre-determined frequency, the information conveyed in the local network being transferred in the form of electrical signals forming waves in the electrical power distribution system in a frequency band higher than the pre-determined frequency, the electrical power distribution system being connected to an electrical power supply system, wherein the device comprises means for reflecting waves forming reflected waves in the power distribution system, the means for reflecting waves comprising at least one condenser.

9. Device as claimed in claim 8, wherein the electrical signals are included in a frequency spectrum between 4 and 20 MHz and the reflection means consist of a condenser with a capacity on the order of 22 nano Farad.

10. Device as claimed in claim 8, wherein the device is integrated into a male electrical plug.

11. Device as claimed in claim 8, wherein the device is integrated into an electrical panel.

12. Device as claimed in claim 8, wherein the device is placed between the phase and the neutral of the electrical power distribution system.

13. Device as claimed in claim 9 wherein the device is placed between the phase and the neutral of the electrical power distribution system.

14. Device as claimed in claim 10 wherein the device is placed between the phase and the neutral of the electrical power distribution system.

15. Device as claimed in claim 11 wherein the device is placed between the phase and the neutral of the electrical power distribution system.

* * * * *